United States Patent
Iwamoto

(10) Patent No.: US 6,538,575 B1
(45) Date of Patent: Mar. 25, 2003

(54) CONTROL SYSTEM, CONTROL DEVICE AND CONTROLLED DEVICE

(75) Inventor: Koji Iwamoto, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/446,571

(22) PCT Filed: May 6, 1999

(86) PCT No.: PCT/JP99/02388

§ 371 (c)(1),
(2), (4) Date: Dec. 21, 1999

(87) PCT Pub. No.: WO99/60752

PCT Pub. Date: Nov. 25, 1999

(30) Foreign Application Priority Data

May 20, 1998 (JP) .......................................... 10-138096

(51) Int. Cl.⁷ .............................................. G05B 19/02
(52) U.S. Cl. ............................ 340/825.22; 340/825.69; 723/133
(58) Field of Search ....................... 340/825.22, 825.23, 340/825.24, 824.69, 825.72, 5.1, 5.22, 5.23; 709/204, 205; 725/108, 109, 133, 131, 114

(56) References Cited

U.S. PATENT DOCUMENTS

| | | | | |
|---|---|---|---|---|
| 4,199,761 A | * | 4/1980 | Whyte et al. | 340/695 |
| 5,132,679 A | * | 7/1992 | Kubo et al. | 340/825.22 |
| 5,619,251 A | * | 4/1997 | Kuriowa et al. | 725/133 |
| 5,721,583 A | * | 2/1998 | Harada et al. | 725/114 |
| 5,777,895 A | | 7/1998 | Kuroda et al. | 702/188 |
| 6,131,111 A | * | 10/2000 | Yoshino et al. | 709/204 |

FOREIGN PATENT DOCUMENTS

| | | |
|---|---|---|
| JP | 1141440 | 6/1989 |
| JP | 324842 | 2/1991 |
| JP | 3127531 | 5/1991 |
| JP | 946441 | 2/1997 |

* cited by examiner

*Primary Examiner*—Van Trieu

(57) ABSTRACT

A communicative control system includes a central control apparatus 100 and a terminal 200 that is remotely controlled according to messages communicated by the central control apparatus 100. Before communication is commenced, the address storing unit 220 of the terminal 200 stores a provisional address, while the unique terminal information storing unit 230 stores unique terminal information. When commencing communication, the central control apparatus 100 uses the provisional address to specify the terminal 200 with which communication is to be performed. The central control apparatus 100 compares the unique terminal information stored in the unique terminal information storing unit 230 in the terminal 200 with the unique terminal information that is stored in advance in the unique terminal information storing unit 122 and is associated with a proper address stored in the address storing unit 121. Depending on the result of the comparison, the central control apparatus 100 then has a corresponding proper address stored in the address storing unit 220 of the terminal 200.

18 Claims, 10 Drawing Sheets

CONTROL SYSTEM, CONTROL DEVICE AND CONTROLLED DEVICE

TECHNICAL FIELD

The present invention relates to a control system that includes a control apparatus and a controlled apparatus that is controlled by the control apparatus. In particular, the present invention relates to an improvement in the control performed at a start of communication within a control system.

BACKGROUND ART

Conventional techniques are available for connecting domestic appliances such as air conditioners and AV (audio-video) appliances to a central control apparatus using coaxial cables, twisted-pair cables, mains cables, or the like as communication paths. The central control apparatus in such a system communicates with the domestic appliances (hereinafter, such apparatuses are referred to as "controlled apparatuses") so that it can control their operations. One such technology has been standardized according to the Japanese HBS (Home Bus System) standard.

Initial communication settings have to be made for communication to take place within a communicative control system composed of a central control apparatus and controlled apparatuses. These settings include the setting of address numbers (referred to hereafter as "own addresses") for identifying the central control apparatus and the controlled apparatuses on the communication network, as well as the setting of address numbers of apparatuses (referred to hereafter as "called addresses") that the central control apparatus and the controlled apparatuses are to communicate with.

The settings described above are conventionally made separately for each apparatus according to manual operations performed when the communicative control system is first used. Such settings made in a conventional communicative control system are described below with reference to FIGS. 8 to 10.

FIG. 8 is a block diagram giving an overview of a conventional communicative control system.

The present conventional communicative control system includes the central control apparatus 600 and the controlled apparatus 700. These apparatuses are interconnected via their respective communication units 610, 710 and the transfer path 900, and so are able to communicate with each other.

The central control apparatus 600 is provided with an own address setting/holding unit 620 for setting and holding the address of the central control apparatus 600 and a called address setting/holding unit 630 for setting and holding the address of the apparatus in communication with the central control apparatus 600. In the same way, the controlled apparatus 700 is provided with an own address setting/holding unit 720 for setting and holding the address of the controlled apparatus 700 and a called address setting/holding unit 730 for setting and holding the address of the apparatus in communication with the controlled apparatus 700.

The central control apparatus 600 is also equipped with control buttons 651~653 that the user can press to select a desired control operation and a control message issuing unit 640 for detecting presses of the control buttons 651~653 and issuing a control message to the controlled apparatus 700.

The controlled apparatus 700 is also equipped with a control unit 740 for controlling the controlled apparatus 700 according to a control message issued by the central control apparatus 600.

For communication to take place between the central control apparatus 600 and the controlled apparatus 700, both the central control apparatus 600 and the controlled apparatus 700 have to internally set their own address and the address of the other apparatus. Such initial communications settings are made in the following way in a conventional communicative control system.

First the user respectively uses the own address setting/holding units 620 and 720 to manually set the own address of the central control apparatus 600 and the own address of the controlled apparatus 700. The values used as the own addresses of the central control apparatus 600 and the controlled apparatus 700 are set within a range determined by the communication protocol being used. As examples, the addresses may be freely set as any integer between 1 and 65535 so long as no two apparatuses in the system have the same own address. In this way, each apparatus in the communicative control system is assigned an exclusive address.

As one example, the user may assign the own address "1" to the central control apparatus 600 and the own address "16553511" to the controlled apparatus 700, in keeping with the conditions given above.

Once the own addresses of each apparatus have been determined as described above, the user uses the called address setting/holding unit 630, 730 to set the called address(es) in the central control apparatus 600 and a called address in the controlled apparatus 700. In this case, the own address of the controlled apparatus 700 is set in the central control apparatus 600 as a called address and the own address of the central control apparatus 600 is set in the controlled apparatus 700 as the called address.

As mentioned above, the central control apparatus 600 is assigned the own address "1", while the controlled apparatus 700 is assigned the own address "65535", so that "65535" is set as a called address of the central control apparatus 600 and "1" is set as the called address of the controlled apparatus 700.

The above setting of the called addresses of the apparatuses completes the initial communication settings and so makes communication between the apparatuses possible. In the present arrangement, the central control apparatus 600 can control the controlled apparatus 700.

In the present example, the control button 651 of the central control apparatus 600 is used to indicate a "power on" operation for the controlled apparatus 700. If the user presses the control button 651, this is detected by the control message issuing unit 640 which issues the corresponding control message and passes it over to the communication unit 610. The communication unit 610 refers to the own address stored in the own address setting/holding unit 620 and the called address stored in the called address setting/holding unit 630 and transfers the received control message from the address number "1" (the central control apparatus 600) to the address number "65535" (the controlled apparatus 700). The control message transmitted in this way passes the transfer path 900 and reaches the communication unit 710 of the controlled apparatus 700.

In the controlled apparatus 700, the control message is sent from the communication unit 710 to the control unit 740 which has an appropriate operation performed for the control message. When the control button 651 is used to indicate a "power on" operation for the controlled apparatus 700, a "power on" control message is issued and the control unit 740 performs control so that the controlled apparatus 700 is switched on.

While the explanation has thus far described a communicative control system having one central control apparatus and one controlled apparatus, the following will examine the procedure for making the communication initialization settings for the case where a central control apparatus is connected to a plurality of controlled apparatuses that are to be controlled individually.

FIG. 9 shows a communicative control system where a central control apparatus 600 is connected to a plurality (here, two) controlled apparatuses 700 and 800, while FIG. 10 shows the construction of the controlled apparatus selection panel 660 that is used during the procedure making the communication initialization settings in this communicative control system. The construction and operation of the controlled apparatus 800 conform to the same standards as the controlled apparatus 700.

As shown in FIG. 9, an additional appliance, the controlled apparatus 800, is connected via the transfer path 900 to the central control apparatus 600 and the controlled apparatus 700 described above.

The central control apparatus 600 includes the controlled apparatus selection panel 660 shown in FIG. 10. This controlled apparatus selection panel 660 includes the "air conditioner 1 settings" button 661 for selecting the air conditioner 1 (which corresponds to the controlled apparatus 700 in FIG. 9) when making the communication initialization settings and the "air conditioner 2 settings" button 662 for selecting the air conditioner 2 (which corresponds to the controlled apparatus 800 in FIG. 10) when making the communication initialization settings.

By pressing the "air conditioner 1 setting" button 661 or "air conditioner 2 setting" button 662 the user can indicate the controlled apparatus to be controlled and so make the communication initialization settings for communication with the specified controlled apparatus.

The user needs to perform such communication initialization settings separately for each controlled apparatus. After the user presses the "air conditioner 1 setting" button 661, the setting operation described above is performed to set addresses for the central control apparatus 600 and the controlled apparatus 700. After this, the user presses the "air conditioner 2 setting" button 662, and the setting operation is performed again to set addresses in the central control apparatus 600 and the controlled apparatus 800.

The conventional communicative control system has the user perform a manual operation (that commences with the user indicating a controlled apparatus via the controlled apparatus selection panel 660) to make the communication initialization settings for the central control apparatus and the separate controlled apparatuses. As a result, communication can be performed between the central control apparatus and each of the controlled apparatuses.

Since the communication initialization settings are made manually, the person who makes the settings requires special knowledge. Since the set addresses are merely numerical strings, the setting process requires special experience and can be difficult for users.

When a communicative control system is newly set up, such as in a new house, a technical specialist needs to be called to make the settings. This is undesirable as it involves labor and other costs. As housewives, the elderly, and children will probably be incapable of changing the settings, a technician will need to be called whenever maintenance is required or the number of controlled apparatus is increased. Such difficulties presented by the procedure for making the communication initialization settings can also hinder the widespread introduction of communicative control systems into the home.

DISCLOSURE OF INVENTION

The present invention was conceived in view of the problems with the background art and has a first object of providing a control system that does not require the user to make the communication initialization settings. A second object of the present invention is to provide a control system that can simplify the control performed by a control apparatus over a controlled apparatus without increasing the amount of data that needs to be exchanged during such control.

The present invention is a control system including a control apparatus and a plurality of controlled apparatuses that communicate with the control apparatus via a communication network to enable the control apparatus to control the controlled apparatuses. Each controlled apparatus includes: own address storing means for storing, in advance, a provisional address that provisionally identifies the controlled apparatus when communication is commenced; and a first storing means for storing, in advance, a set of unique information that is unique to the controlled apparatus and does not depend on whether or not the controlled apparatus is connected to the communication network. The control apparatus includes: client address storing means for storing proper addresses for identifying controlled apparatuses once communication has begun, each proper address being exclusively assigned to one of the controlled apparatuses connected to the communication network; a second storing means for storing, in advance, a set of unique information for each controlled apparatus connected to the communication network, each set of unique information being associated with one of the proper addresses stored by the client address storing means; and first control means for performing control that (i) specifies, when communication is commenced, a controlled apparatus to which communication is to be performed using the provisional address stored in the own address storing means of the controlled apparatus, (ii) compares a set of unique information stored in the first storing means of the controlled apparatus with a set of unique information stored in the second storing means, and (iii) stores, based on a comparison result, a proper address stored in the client address storing means in place of the provisional address in the own address storing means of the controlled apparatus.

When communication is commenced, the control apparatus specifies the device with which it is in communication using the provisional address stored in the controlled apparatus. The control apparatus compares the unique information that is stored in advance in the control apparatus and in the controlled apparatus and, depending on the result of the comparison, has the controlled apparatus store a proper address, which it receives from the control apparatus, in place of the provisional address.

In this way, the control apparatus assigns a proper address to a controlled apparatus at the start of communication, so that the user does not need to make the communication initialization settings.

Here, each set of unique information may include one of: (1) data showing the manufacturer of a controlled apparatus; (2) data showing the model number of the controlled apparatus; (3) data showing the product number of the controlled apparatus; and (4) data showing a classification of the controlled apparatus.

When communication is commenced, the control apparatus specifies the device with which it is in communication using the provisional address stored in the controlled apparatus. The control apparatus compares 15 data showing any of (1) the manufacturer of the controlled apparatus, (2) the model number of the controlled apparatus, (3) the product number of the controlled apparatus and (4) the appliance type of the controlled apparatus, such data being stored in advance in the control apparatus and in the controlled apparatus. Depending on the result of the comparison, the control apparatus sends a proper address to the controlled apparatus and has the controlled apparatus store the proper address in place of the provisional address.

In this way, the control apparatus assigns a proper address to a controlled apparatus at the start of communication, so that the user does not need to make the communication initialization settings.

Here, the control system may further comprise a first external management apparatus that manages the sets of unique information of controlled apparatuses and is outside the communication network, wherein sets of unique information stored in advance in the second storing means of the control apparatus have been sent to the control apparatus from the first external management apparatus.

With the above control system, the sets of unique information are stored in advance in the second storing means of the control apparatus by having them sent from the first external management apparatus to the control apparatus.

As a result, the control apparatus can assign a proper address to a controlled apparatus without needing the user to make the communication initialization settings. The sets of unique information used during this process are sent from the first external management apparatus, making the setting process even more convenient for users.

Here, each controlled apparatus may further includes third storing means for storing, in advance, a set of first data relating to functions of the controlled apparatus, and the control apparatus may further include: fourth storing means for storing sets of first data; and second control means performing control so that the set of first data stored in the third storing means of a controlled apparatus is copied into the fourth storing means after control has been performed by the first control means.

With the above construction, the controlled apparatus stores a set of first data that relates to the functions of the controlled apparatus in advance. After control by the first control means is complete, this first data is stored in the fourth storing means of the control apparatus.

As a result, the control apparatus can assign a proper address to a controlled apparatus without needing the user to make the communication initialization settings. When these settings are made, the first data is sent to the control apparatus, which simplifies the control of the controlled apparatus by the control apparatus without increasing the amount of data transferred during such control.

Here, each controlled apparatus may further include: fifth storing means for storing a set of second data that cannot be determined when the controlled apparatus is manufactured, and the control apparatus may further include: sixth storing means for storing, in advance, the set of second data of each control apparatus; and third control means for performing control to copy a set of second data already stored in the sixth storing means into the fifth storing means after control has been performed by the first control means.

In this control system, second data, which cannot be determined when the controlled apparatus is manufactured, is stored in the control apparatus before communication begins. After control has been performed by the first control means, the second data is stored in the fifth storing means of the controlled apparatus.

As a result, the control apparatus can assign a proper address to a controlled apparatus without needing the user to make the communication initialization settings. When these settings are made, the second data is sent to the controlled apparatus, which simplifies the control relating to data that cannot be determined when the controlled apparatus is manufactured, without increasing the amount of data transferred during such control.

Here, the control system may further comprise a second external management apparatus that manages the sets of second data but is not connected to the communication network, wherein the sets of second data stored in advance in the sixth storing means of the control apparatus have been sent to the control apparatus from the second external management apparatus.

In the above system, a second external management apparatus provided outside the communication network transmits the sets of second data to the control apparatus so as to store the sets of second data in the sixth storage means of the control apparatus before the communication begins.

As a result, the control apparatus can assign a proper address to a controlled apparatus without needing the user to make the communication initialization settings. When these settings are made, the second data will have already been sent from the second external to the controlled apparatus, which simplifies the control relating to data that cannot be determined when the controlled apparatus is manufactured, without increasing the amount of data transferred during such control.

The stated objects can also be achieved by a control system including a control apparatus and a controlled apparatus that communicate with the control apparatus via a communication network to enable the control apparatus to control the controlled apparatus, wherein a set of first data and a set of second data are commonly established in the control apparatus and the controlled apparatus, the set of first data relating to functions of the controlled apparatus and the set of second data not being determined when the controlled apparatus is manufactured.

In the above control system, the control apparatus and controlled apparatus share first data relating to the functions of the controlled apparatus and second data that cannot be determined when the controlled apparatus is manufactured.

Sharing the first and second data in this way simplifies the control performed by the control apparatus over the controlled apparatus without increasing the amount of data that is transferred during such control.

Here, each set of first data may include data showing functions of the controlled apparatus that can be controlled through communication by the control apparatus and data showing power consumption for the functions.

With the above construction, data showing the functions of the controlled apparatus that can be controlled by the control apparatus, data showing the power consumption of these functions, and second data that cannot be determined when the controlled apparatus is manufactured are shared by the control apparatus and the controlled apparatus.

This simplifies the control performed by the control apparatus over the controlled apparatus without increasing the amount of data that is transferred during such control.

Here, each set of second data may include data showing a place where the controlled apparatus is installed and data showing a simple name that identifies the controlled apparatus but differs from the model number.

With the above construction, the first data and either data showing the installed location of the controlled apparatus or data showing a convenient name for the controlled apparatus are shared by the control apparatus and the controlled apparatus.

This simplifies the control performed by the control apparatus over the controlled apparatus without increasing the amount of data that is transferred during such control.

When communicating with a suitable device, the control apparatus and controlled apparatus described above as part of a control system can by themselves achieve the same effects as the control system.

The present invention can also be achieved by software.

The stated objects can be realized by a computer-readable recording medium on which a program to be installed into a control apparatus has been recorded, the control apparatus being connected via a communication network to a plurality of controlled apparatuses that the control apparatus controls through communication, wherein before commencing communication, each controlled apparatus stores: (i) a provisional address that is set in advance and enables the control apparatus to provisionally identify the controlled apparatus when communication is commenced; and (ii) unique information that is unique to the controlled apparatus, wherein before commencing communication, the control apparatus stores: (a) proper addresses to be assigned exclusively to controlled apparatuses connected to the communication network; and (b) sets of unique information, each of which is associated with a different proper address, and wherein when communication commences, the control apparatus operates according to the program: (1) to specify a controlled apparatus with which the controlled apparatus has not previously communicated using the provisional address stored by the controlled apparatus; (2) to compare the set of unique information stored by the controlled apparatus with the sets of unique information in the control apparatus; and (3) to store, depending on a comparison result, a proper address in place of the provisional address in the controlled apparatus.

At the start of communication, the program described above specifies the controlled apparatus using the provisional address stored in advance by the controlled apparatus. The program compares the unique information stored in the control apparatus with the unique information stored in the controlled apparatus and, depending on the result of this comparison, has the controlled apparatus store a proper address in place of the provisional address.

The above procedure has the control apparatus assign a proper address to the controlled apparatus at the start of communication, and makes communication initialization settings by the user unnecessary.

The objects can also be realized by a computer-readable recording medium on which a program to be installed into controlled apparatus is recorded, the controlled apparatus being connected via a communication network to a control apparatus that controls the controlled apparatus through communication, wherein before commencing communication, the control apparatus stores: (1) proper addresses to be assigned exclusively to controlled apparatuses connected to the communication network, each proper address being used to identify a controlled apparatus after communication is commenced; and (2) sets of unique information, each of which is unique to a controlled apparatus and is exclusively associated with one of the proper addresses, wherein when communication begins, the control apparatus performs control: (i) to specify a controlled apparatus using a provisional address that is stored in the controlled apparatus in advance; (ii) to compare the unique information stored in advance in the controlled apparatus with the unique information stored in the control apparatus; and (iii) to have the controlled apparatus store a proper address in place of the provisional address, depending on a comparison result, and wherein the controlled apparatus operates according to the program and control by the control apparatus to store the proper address in place of the provisional address.

At the start of communication, the program described above has the controlled apparatus store a proper address in place of the provisional address.

As a result, the control apparatus assigns a proper address to the controlled apparatus at the start of communication, so that communication initialization settings by the user are unnecessary.

BEST MODE FOR CARRYING OUT THE INVENTION

The following describes a communicative control system that is an embodiment of the present invention by referring to the attaching drawings.

Figure 1:
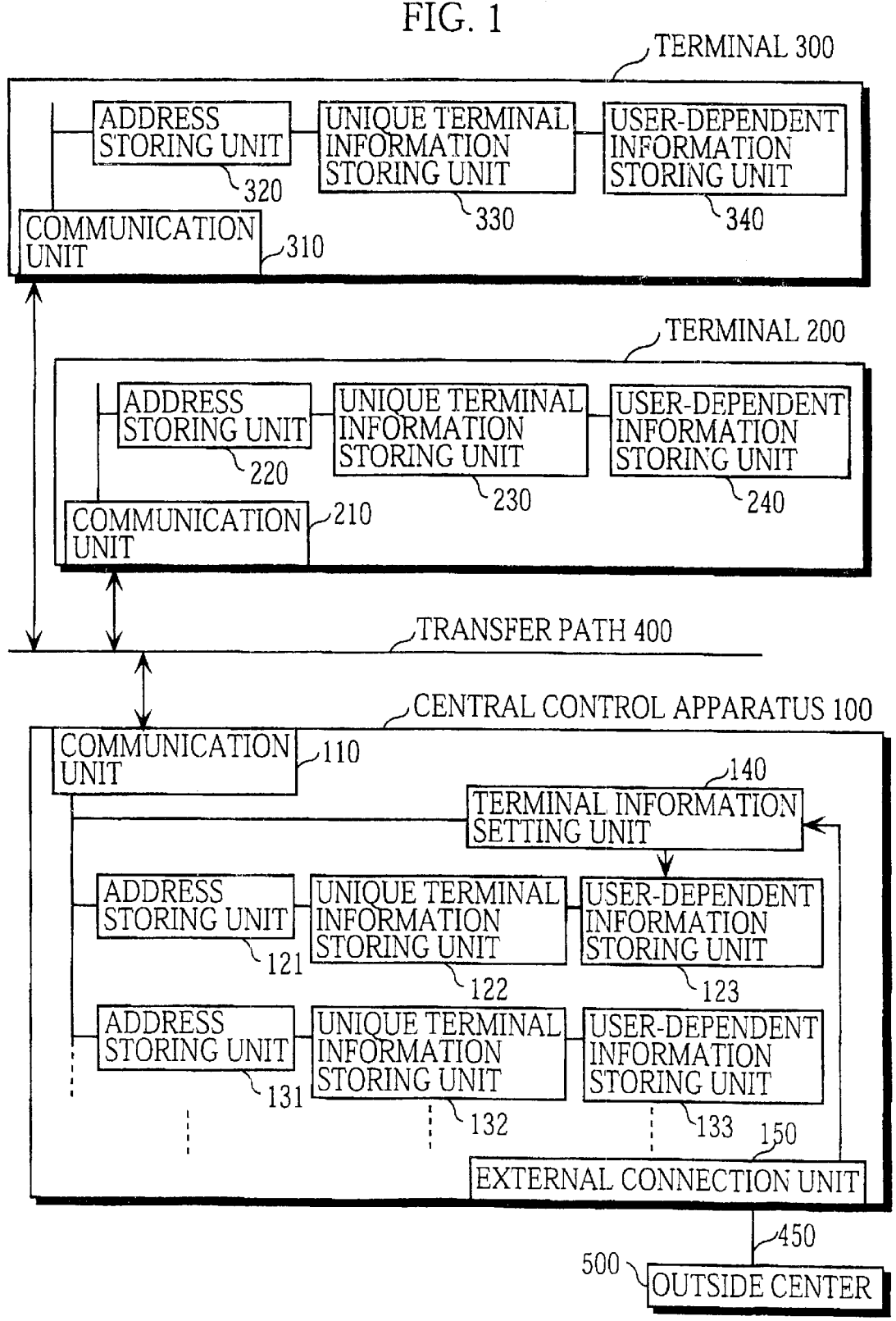
FIG. 1 is a block diagram showing the basic construction of a communicative control system that is an embodiment of the present invention.

FIG. 1 is a block diagram showing an overview of the construction of a communicative control system that is an embodiment of the present invention.

The communicative control system includes a central control apparatus 100, terminals 200 and 300, transfer paths 400, the outside communication line 450, and the outside center 500. The terminals 200 and 300 are controlled by the central control apparatus 100 and equate to the domestic appliances referred to in the "Background Art" section as controlled apparatuses. The transfer paths 400 enable communication to be performed between the central control apparatus 100 and the terminals 200 and 300. The outside communication line 450 connects the central control apparatus 100 and the outside center 500. The outside center 500 connects with the central control apparatus 100 as necessary via the outside communication line 450 and transmits information it stores in advance relating to the terminals 200, 300 to the central control apparatus 100. This information includes the unique terminal information A and the user-dependent information which are both described later. The following operation omits the construction and operation of the terminal 300 since these conform to the same standards as the construction and operation of the terminal 200.

The terminal 200 includes the communication unit 210, the address storing unit 220 for storing an address for identifying the terminal 200, a unique terminal information storing unit 230 for storing unique terminal information (described later), and a user-dependent information storing unit 240 for storing user-dependent information (described later).

The central control apparatus 100 includes a communication unit 110, an address storing unit 121, a unique terminal information storing unit 122, a user-dependent information storing unit 123, an address storing unit 131, a unique terminal information storing unit 132, a user-dependent information storing unit 133, a terminal information setting unit 140, and an external connection unit 150. The communication unit 110 communicates with the terminals 200 and 300. The address storing unit 121 stores an address for identifying the terminal 200 when communicating. The unique terminal information storing unit 122 stores the unique terminal information of the terminal 200. The user-dependent information storing unit 123 stores the user-dependent information of the terminal 200. The address storing unit 131 stores an address for identifying the terminal 300 when communicating. The unique terminal information storing unit 132 stores the unique terminal information of the terminal 300. The user-dependent information storing unit 133 stores the user-dependent information of the terminal 300. The terminal information setting unit 140 sets the unique terminal information and the user-dependent information. The external connection unit 150 communicates with the outside center 500 to receive part of the unique terminal information (specifically the unique terminal information A described later) and the user-dependent information from the outside center 500.

In this example, the central control apparatus 100 stores the addresses for the maximum number of terminals that can be controlled in advance, with the central control apparatus 100 storing a set of a terminal address, unique terminal information and user-dependent information for each terminal to which the central control apparatus 100 connects. Before commencing communication with a terminal, the central control apparatus 100 stores the address, part of the unique terminal information (this part being the unique terminal information A described later) and the user-dependent information as a set. The procedure performed when communication is commenced between the central control apparatus 100 and a terminal is described later with reference to FIGS. 5 to 7.

The unique terminal information is unique information for each terminal that is determined at the time of manufacture, and includes the manufacturer of the terminal, the model number, the product number, the manufacturing date, the manufacturing location, the manufacturing lot, the functions provided to the terminal (as a domestic appliance), the functions that can be controlled remotely (i.e., via communication), and the power consumption of the terminal. The user-dependent information, meanwhile, includes information relating to how the user uses the terminal after purchasing it, and so includes the installed location of the terminal and a reference name for the device.

As one example, the unique terminal information may include:

"A Ltd." as the manufacturer;

"AG-XX1" as the model number;

"12345678" as the product number;

"Oct. 2, 1999" as the manufacturing date;

"Newcastle, U.K." as the manufacturing location,

"199-4" as the manufacturing lot,

"heating, cooling, dehumidifying" as the provided functions,

"heating between $X°$ C. and $Y°$ C. to a precision of $Z°$", "cooling between $x°$ C. and $y°$ C. to a precision of $z°$", and "dehumidifying between P % and Q % to a precision of R %" as the functions that can be controlled remotely; and "xx W during heating, yy W during cooling, zz W during standby, and maximum power rating pp W" as the power consumption.

As one example, the user-dependent information may include:

"kitchen" as the installed location; and

"air conditioner" as the reference name.

Out of convenience, the following explanation will refer to the manufacturer, the model number and product number as the unique terminal information A, and the rest of the unique terminal information (i.e., the manufacturing date, the manufacturing location, the manufacturing lot, the functions provided to the terminal, the functions that can be controlled remotely, and the power consumption) as the unique terminal information B. The content of the unique terminal information and the user-dependent information is shown in Table 1.

When communication is commenced in the present communicative control system, the unique terminal information A and the user-dependent information are already stored in the central control apparatus 100. This information, however, does not need to be received from the outside center 500 via the external connection unit 150 and to be set in the appropriate storing units by the terminal information setting unit 140. Instead, an input unit 160 can be provided in the central control apparatus (such a central control apparatus being hereafter referred to as central control apparatus 90) and used to receive an input of this information and to have the information set in the appropriate storing units by the terminal information setting unit 140.

Figure 2:
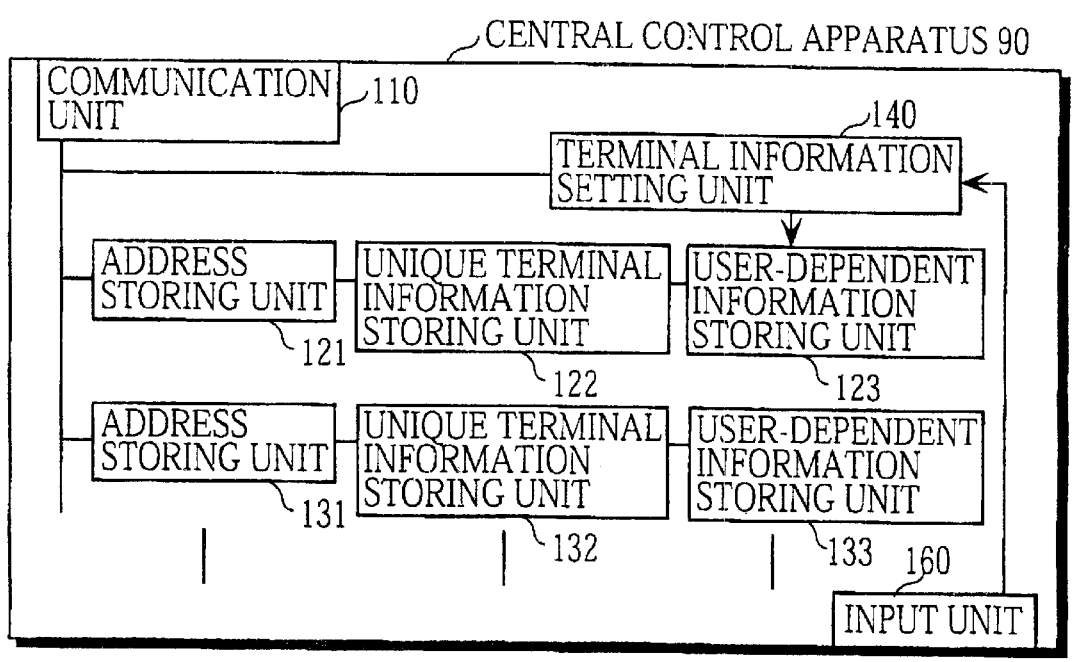
FIG. 2 shows the construction of the central control apparatus 90 that has an input unit 160.

FIG. 2 shows the construction of the central control apparatus 90 that has an input unit 160. Components that have the same functions as those in the central control apparatus 90 of FIG. 1 are given the same reference numerals. This central control apparatus 90 is able to receive information via its input unit 160 without having to connect to the outside center 500.

Figure 3:
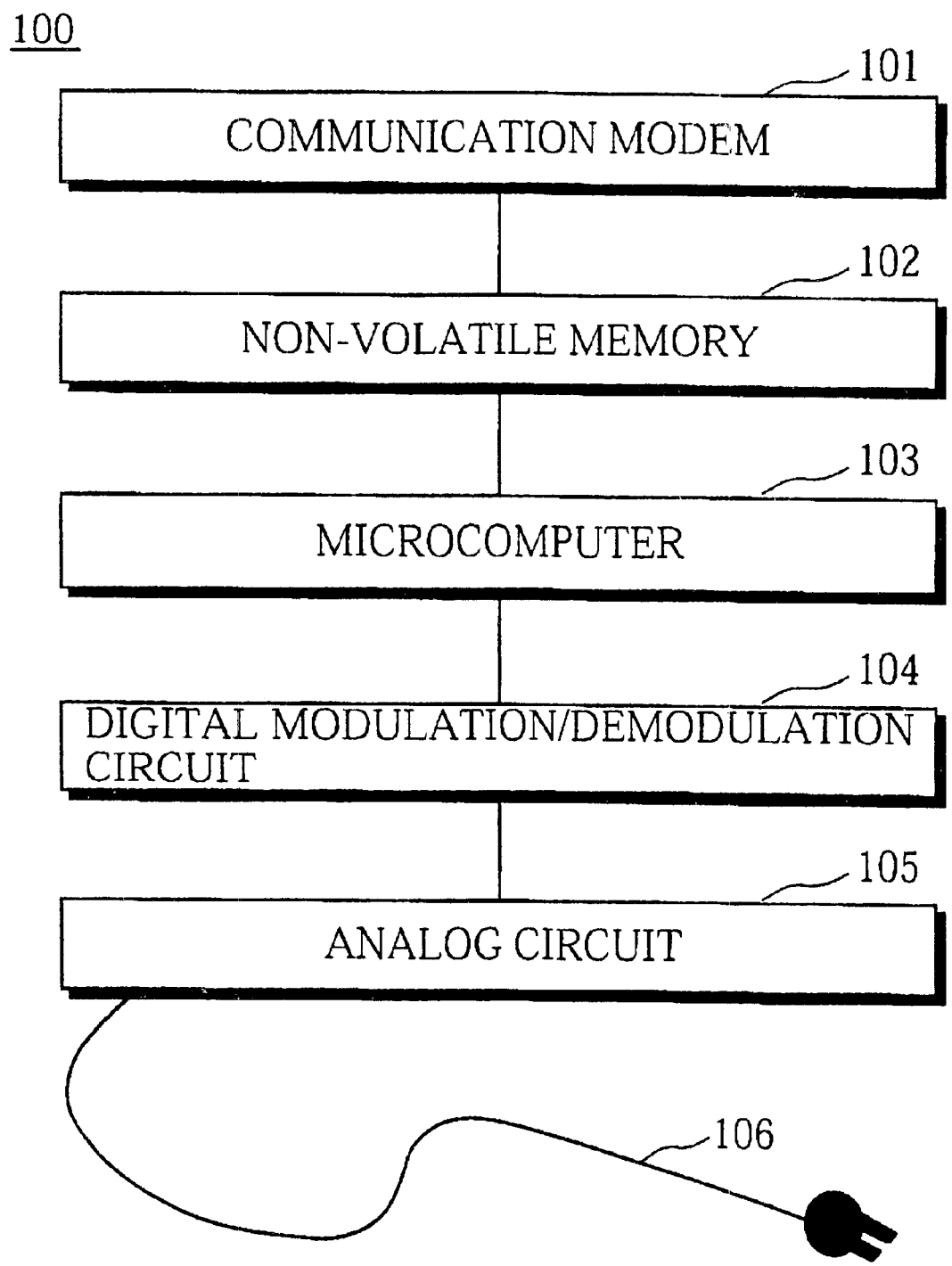
FIG. 3 shows the construction of the central control apparatus 100.
Figure 4:
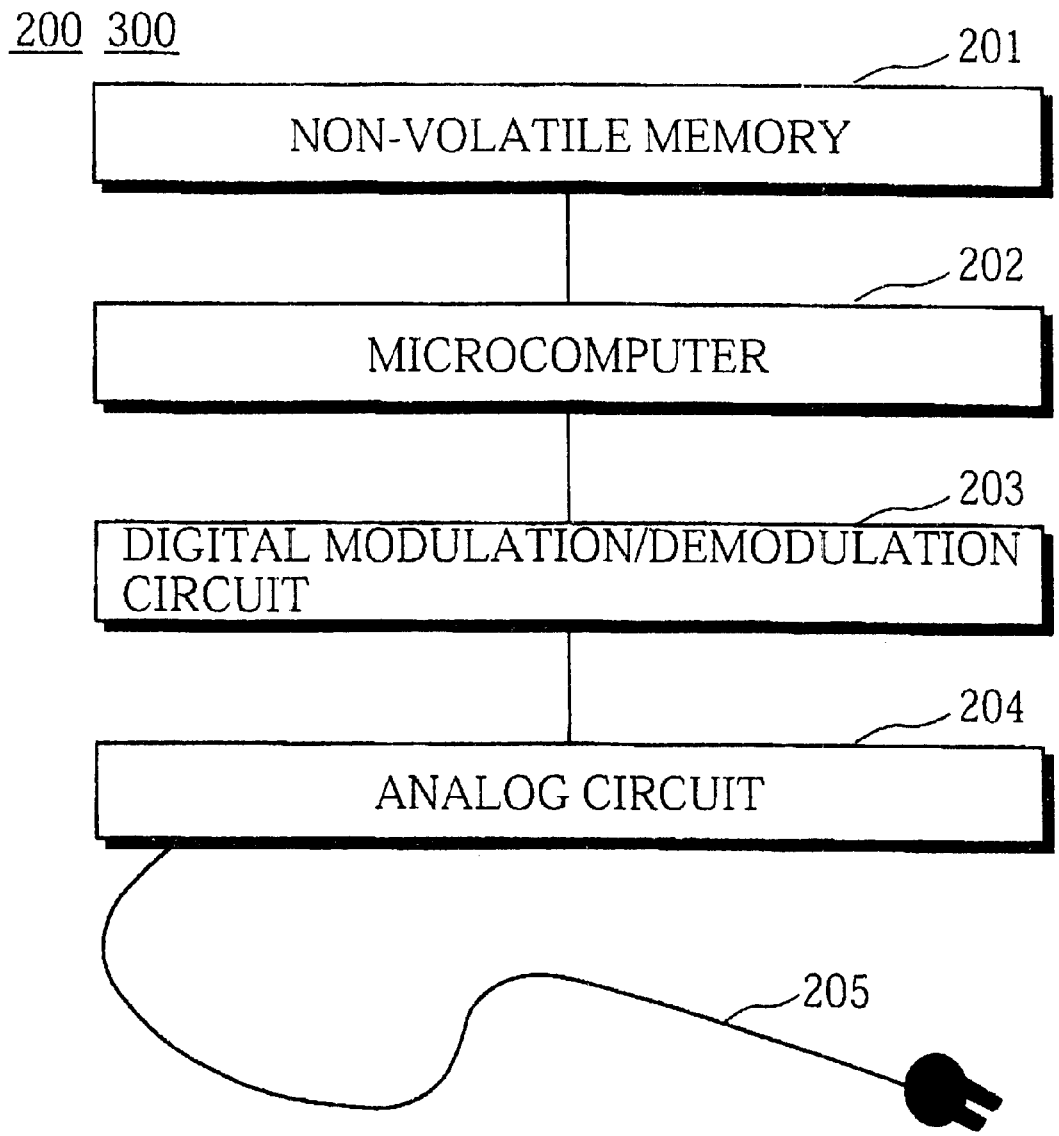
FIG. 4 shows the construction of the terminals 200, 300.

A central control apparatus 100 (or central control apparatus 90) and terminals 200, 300 equipped with the functions described above can be realized by the physical construction shown in FIGS. 3 and 4. FIG. 3 shows the construction of the central control apparatus 100, while FIG. 4 shows the construction of each of the terminals 200 and 300.

As shown in FIG. 3, the central control apparatus 100 is a physical construction for realizing the functions described above, and so includes a communication modem 101, a non-volatile memory 102, a microcomputer 103, a digital modulation/demodulation circuit 104, an analog circuit 105, and a main cable 106. The communication modem 101 performs communication with external devices. The non-volatile memory 102 stores information such as the unique terminal information and the user-dependent information. The microcomputer 103 principally includes a CPU (Central Processing Unit), and memory such as ROM (Read-Only Memory) and RAM (Random Access Memory), and is used to execute software that transfers data using any protocol used to transfer data on a wired connection. The digital modulation/demodulation circuit 104 modulates and demodulates signals that are transferred on a main cable. The analog circuit 105 is used for electrically connecting the central control apparatus 100 to a mains cable. The mains cable 106 is used as the communication medium. As shown in FIG. 4, the terminals 200, 300 have a non-volatile memory 201, a microcomputer 202, a digital modulation/demodulation circuit 203, an analog circuit 204, and a main cable 205.

The communication unit 110 of the central control apparatus 100 shown in FIG. 1 corresponds to the digital modulation/demodulation circuit 104 and the analog circuit 105. The address storing units 121, 131, etc., the unique terminal information storing units 122, 132, etc., and the user-dependent information storing unit 123, 133, etc. all correspond to the non-volatile memory 102. The external connection unit 150 corresponds to the communication modem 101, while the terminal information setting unit 140 and the control unit (not illustrated in FIG. 1) that performs overall control over the components of the central control apparatus 100 corresponds to the microcomputer 103. The various components of the terminals 200, 300 shown in FIG. 1 similarly correspond to the non-volatile memory 201, the microcomputer 202, the digital modulation/demodulation circuit 203, and the analog circuit 204, while the parts of the transfer path 400 shown in FIG. 1 near the apparatuses correspond to the main cables 106.

The following describes the control procedure for making the communication initialization settings when communication is commenced between the central control apparatus 100 and the terminal 200 whose structures are described above. In this case, the terminal 200 is assumed to have been newly connected to the the central control apparatus 100, so that the procedure making the communication initialization settings is performed by the central control apparatus 100 and the terminal 200.

Assume that the following addresses have been assigned in the communication network formed by the present communicative control system before the procedure making the communication initialization settings is commenced. The central control apparatus 100 has been assigned the address add0 (such as the address "1"), while the terminal 200 has been provisionally assigned the address addx (such as the address "1165535"). The provisional address addx is a specific address showing that the terminal 200 has not been assigned an address on the communication network. Unique terminal information, such as the example given above, is assumed to have been stored in the unique terminal information storing unit 230 of the terminal 200 before the terminal 200 leaves the factory.

Figure 5:
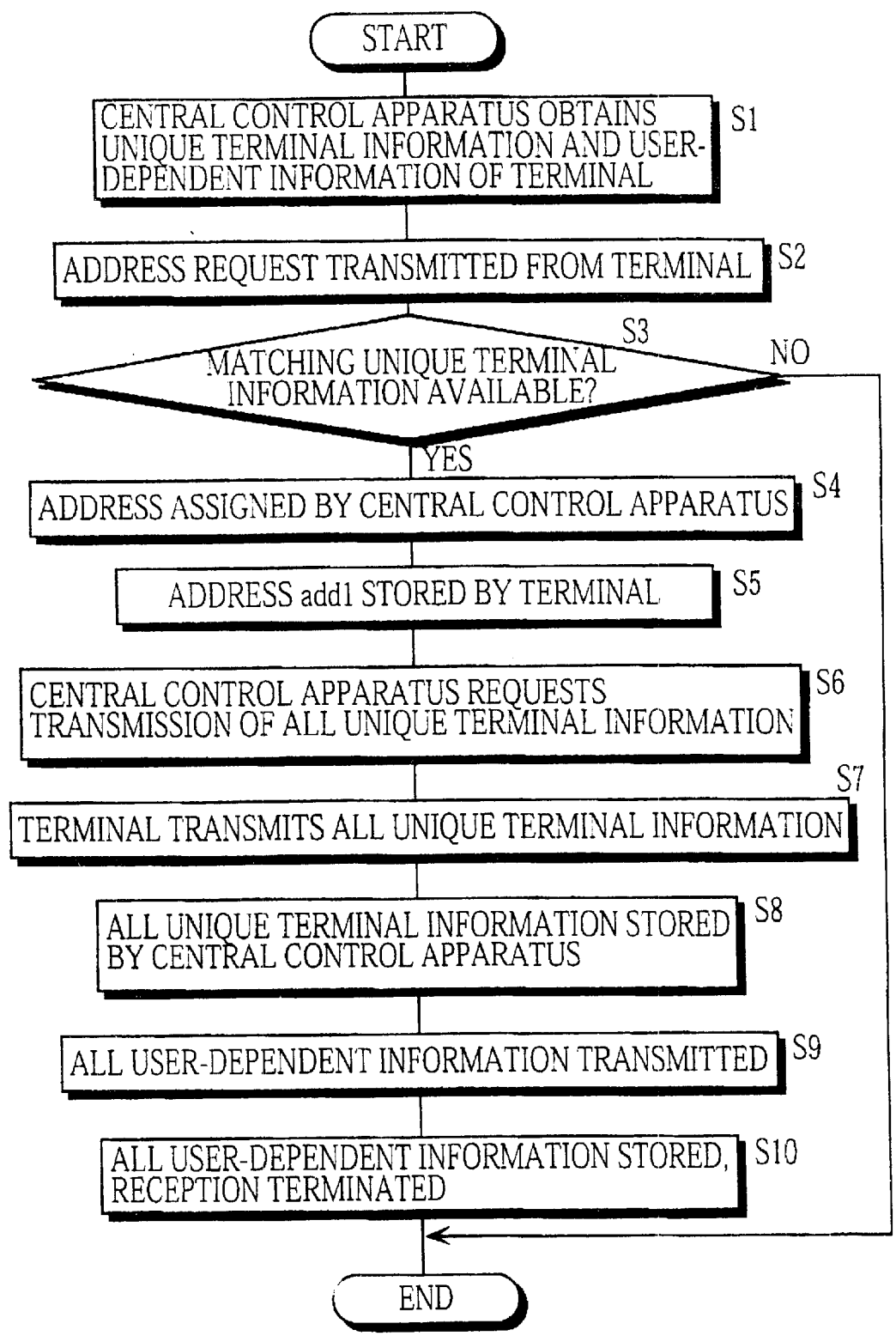
FIG. 5 is a flowchart showing the control procedure for the communication initialization settings in the present communicative control system.

FIG. 5 is a flowchart showing the control procedure or the communication initialization settings in the resent communicative control system.

When commencing communication, the central control apparatus 200 (see FIG. 1) first obtains the unique terminal information A (information showing the manufacturer, the model number, and product number as part of the unique terminal information) and the user-dependent information (information showing the installed location and user name) of the terminal 200 that is to be newly connected from the outside center 500. The central control apparatus 90 (see FIG. 2) performs this operation based on a manual operation mode using the input unit 160. The unique terminal information A is stored in the unique terminal information storing unit 122 and the user-dependent information storing unit 123 (S1). The unique terminal information A and user-dependent information referred to here are respectively stored in the unique terminal information storing unit 122 and the user-dependent information storing unit 123 in combination with one address add1, such as the address 100, that is stored in the address storing unit 121. The address storing unit 121 stores in advance a number of addresses that is equal to the maximum number of terminals that can be handled by the central control apparatus 100.

When this information has been stored in the central control apparatus 100 and in the terminal 200, the communication unit 210 of the terminal 200 transmits an address request to the central control apparatus 100 that is assigned the address add0 using the provisional address addx (S2). When making this address request, the terminal 200 also sends information (such as the manufacturer name "A Ltd." and the product number "12345678") that (i) is stored in the unique terminal information storing unit 230 and (ii) forms part of the unique terminal information A stored in the unique terminal information storing unit 122 of the central control apparatus 100.

The communication unit 110 of the central control apparatus 100 receives this information and judges whether the unique terminal information A stored in the unique terminal information storing unit 122 in step S1 matches the information including the unique terminal information A that was transmitted from the terminal 200 in step S2 (S3). If not (S3:No), the present procedure ends. If the information matches, however (S3:Yes), the central control apparatus 100 provides the address add1, which is stored in the address storing unit 121 corresponding to the combination of the matching unique terminal information, to the terminal 200 that has the provisional address addx (S4).

After step S4, the communication unit 210 of the terminal 200 receives the address add1 which is then stored in the address storing unit 220 (S5). This storing of the address add1 completes the setting of the address that will be used thereafter in communication by the terminal 200.

The central control apparatus 100 next instructs, via the communication unit 210, the terminal 200 that has been given the address add1 to transmit all of the unique terminal information stored in its unique terminal information storing unit 230 (S6). On receiving this instruction, the communication unit 210 of the terminal 200 transmits the unique terminal information including the unique terminal information A (showing the manufacturer, product number, and model number) and the unique terminal information B (showing the manufacturing date, the manufacturing location, the manufacturing lot, the functions provided to the terminal, the functions that can be controlled remotely, and the power consumption) to the central control apparatus 100 (S7).

After this, the communication unit 110 of the central control apparatus 100 receives all of the unique terminal information sent from the terminal 200 and stores the information into the unique terminal information storing unit 122 (S8). Once the unique terminal information has been stored, the communication unit 110 of the central control apparatus 100 transmits all of the user-dependent information of the terminal 200 obtained in step S1 to the terminal 200 (S9). The communication unit 210 of the terminal 200 receives this user-dependent information and stores all of the user-dependent information in the user-dependent information storing unit 240 (S10). The communication unit 210 of the terminal 200 then transmits data showing that the communication initialization settings have been completed, and by doing so completes the procedure making the communication initialization settings.

The following explanation describes the main data that is transferred between the central control apparatus 100 and the terminal 200 when performing the above procedure for making the communication initialization settings.

Figure 6:
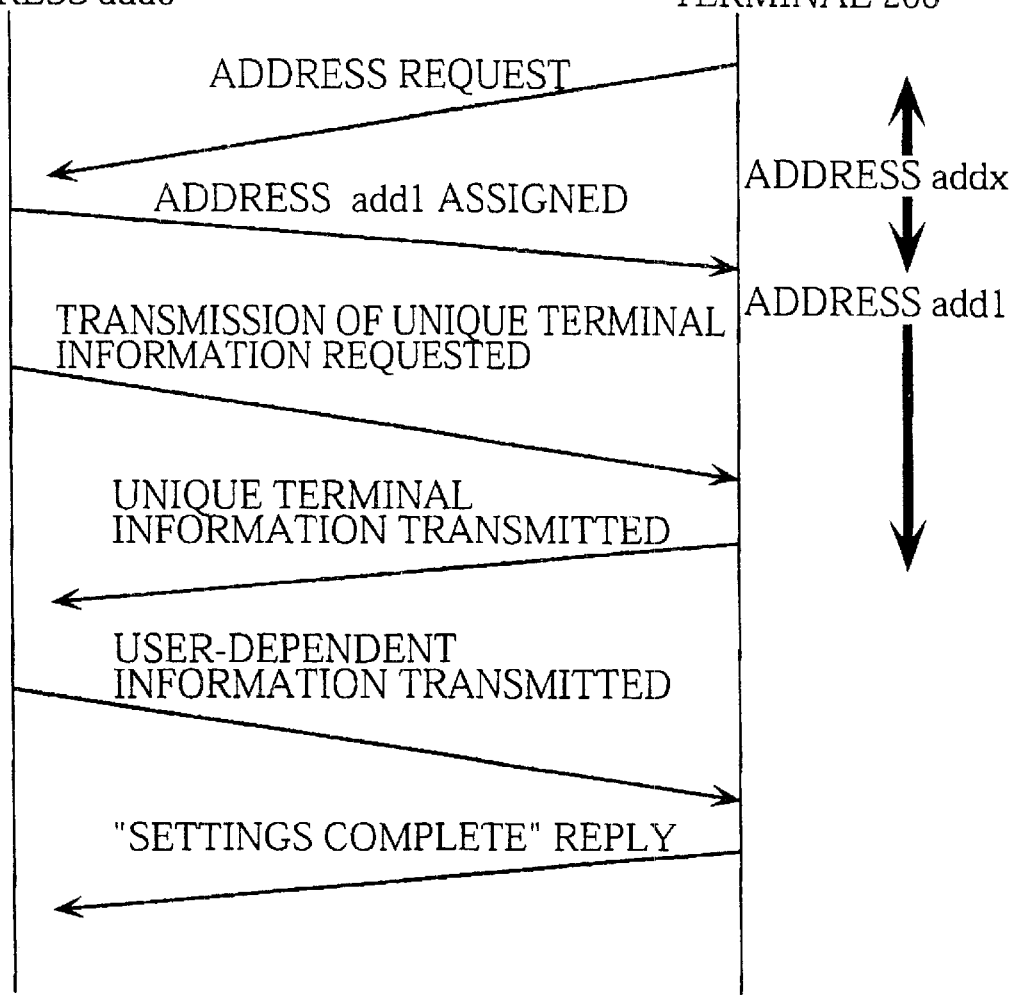
FIG. 6 shows the exchanges of data performed during the communication initialization settings in the present communicative control system.

FIG. 6 shows the exchanges of data performed during the procedure for making the communication initialization settings in the present communicative control system. Note that before this procedure takes place, the address add1, the unique terminal information A and the user-dependent information of the terminal 200 are respectively stored in the address storing unit 121, the unique terminal information storing unit 122 and the user-dependent information storing unit 123 in the central control apparatus 100 as one set of information.

During the procedure making the communication initialization settings in the present communicative control system, the terminal 200 first sends an address request and the unique terminal information A to the central control apparatus 100. This address request includes the address addx as the address of the sender and requests the setting of a proper address. In response, the central control apparatus 100 transmits data to assign the address add1 to the terminal 200 that currently uses the address addx. Next the central control apparatus 100 transmits a unique terminal information transmission request, which requests transmission of all of the unique terminal information, to the address add1. The terminal 200 receives this request and accordingly transmits all of its unique terminal information to the central control apparatus 100.

The central control apparatus 100 next transmits the user-dependent information. After this, data showing that the communication initialization settings have been made is transmitted to the central control apparatus 100 to end the procedure that makes the communication initialization settings.

The data transfers described above result in the terminal 200 that was assigned the provisional address addx being assigned the proper address add1 that is used in the subsequent communication. The user-dependent information of the terminal 200 and the unique terminal information, which are respectively stored in the central control apparatus 100 and the terminal 200 before the communication initialization setting procedure starts, are transferred by the data exchanges between the central control apparatus 100 and the terminal 200, so that the unique terminal information and the user-dependent information are shared between the central control apparatus 100 and the terminal 200 using their respective storing units.

The control procedure shown in FIG. 5 is also capable of simultaneously making the required communication initialization settings for a plurality of newly installed terminals 200, 300, etc.

Figure 7:
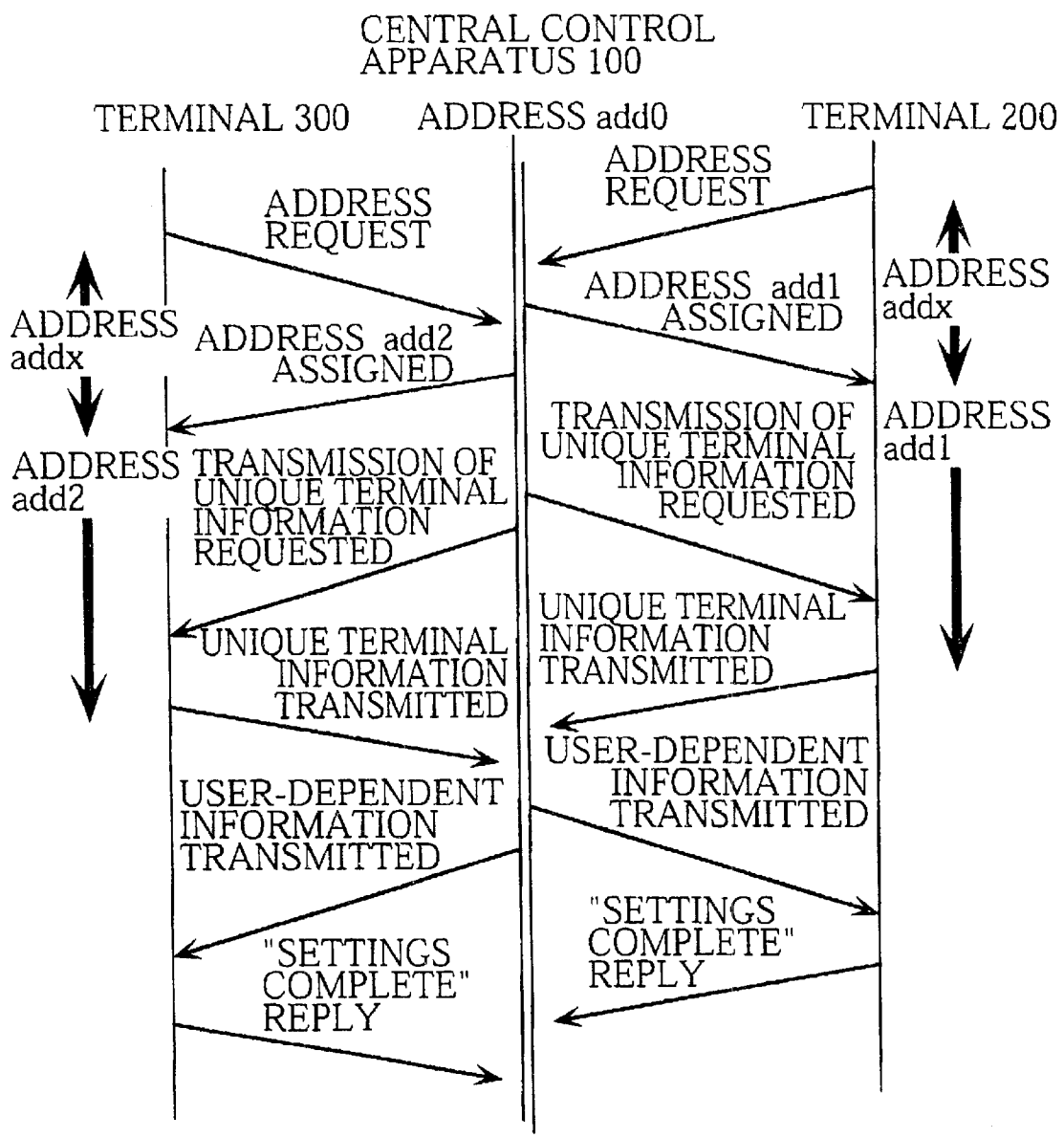
FIG. 7 shows the exchanges of data performed when simultaneously making the communication initialization settings for a plurality of terminals 200, 300 in the present communicative control system.
Figure 8:
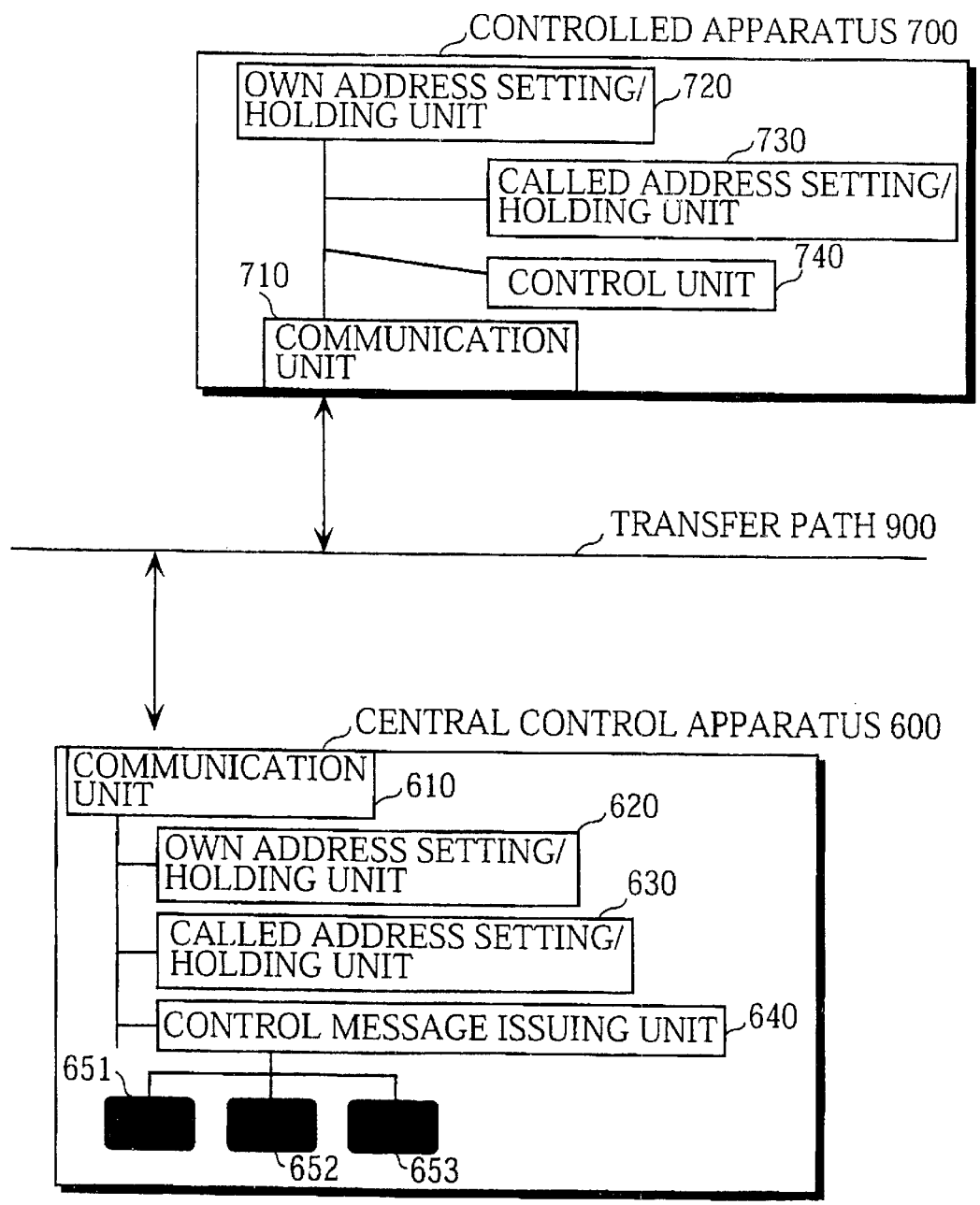
FIG. 8 is a block diagram showing an overview of a conventional communicative control system.
Figure 9:
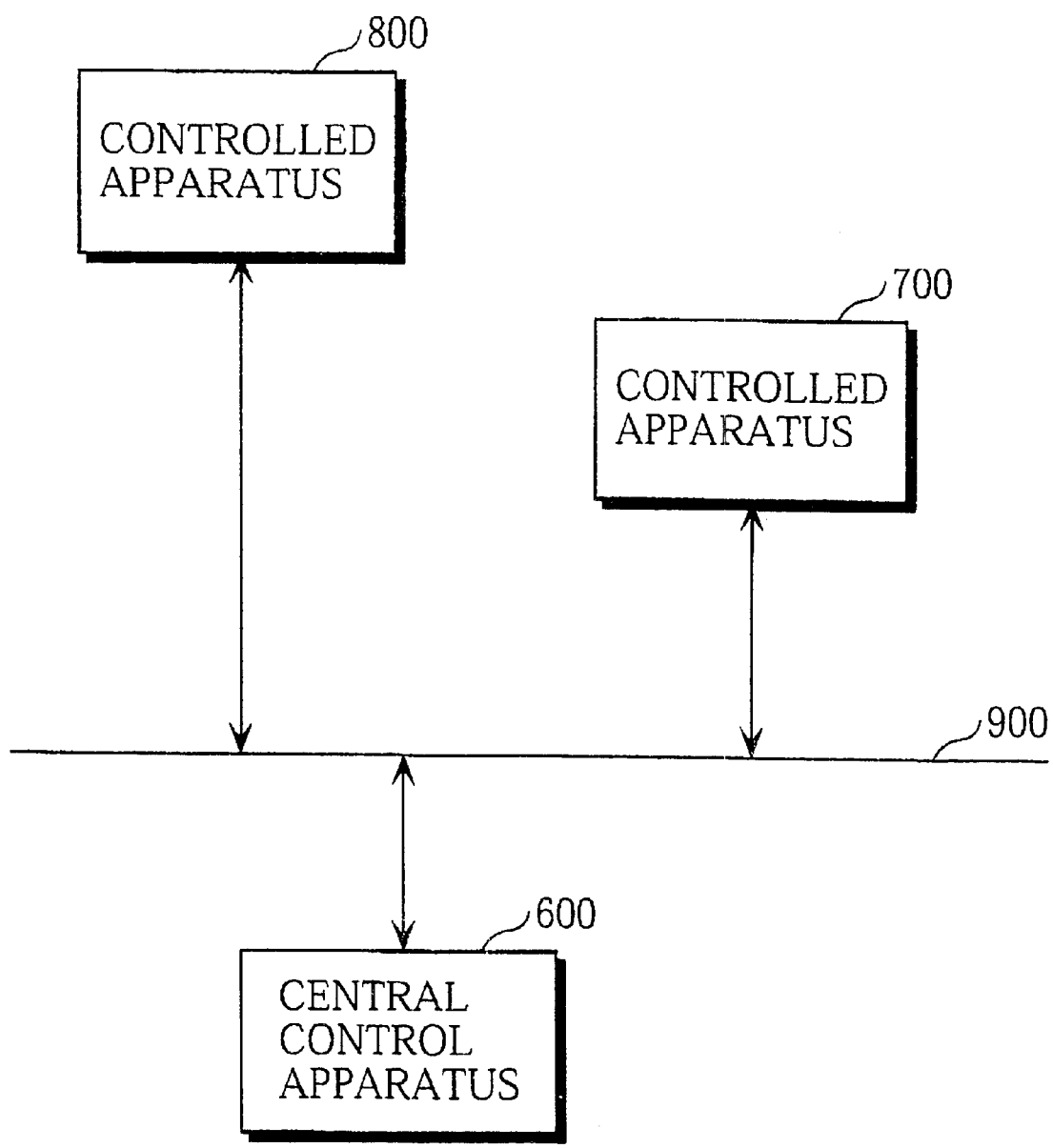
FIG. 9 shows a communicative control system where a central control apparatus 600 is connected to a plurality of controlled apparatuses 700 and 800.
Figure 10:
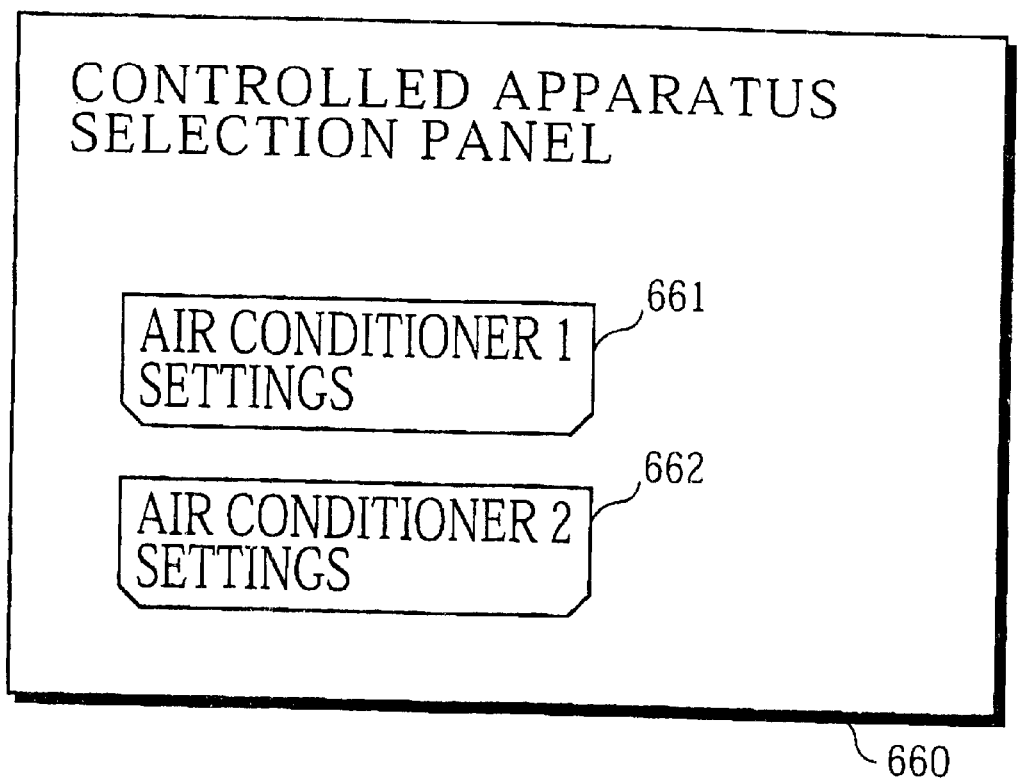
FIG. 10 shows the construction of the controlled apparatus selection panel 660 that is used when making the communication initialization settings if the central control apparatus 600 is connected to a plurality of controlled apparatuses 700, 800.

FIG. 7 shows the exchanges of data performed during the communication initialization settings that are simultaneously made for a plurality of terminals 200, 300 in the present communicative control system. Note that before the communication initialization setting procedure takes place, the address add1, the unique terminal information A and the user-dependent information of the terminal 200 are respectively stored in the address storing unit 121, the unique terminal information storing unit 122 and the user-dependent information storing unit 123 in the central control apparatus 100 as one set of information, and that the address add2, the unique terminal information A and the user-dependent information of the terminal 300 are respectively stored in the address storing unit 131, the unique terminal information storing unit 132 and the user-dependent information storing unit 133 in the central control apparatus 100 as another set of information.

When performing the communication initialization setting procedure for the two terminals 200 and 300, the central control apparatus 100 will already store the unique terminal information A for identifying the respective terminals, and the address requests received from the terminal 200 and the terminal 300 will be accompanied by the unique terminal information A of each terminal. As a result, the central control apparatus 100 can exchange data with each terminal in the same way as in FIG. 6 and, by referring to the stored unique terminal information A and the unique terminal information A that accompanies the address request (this corresponds to the processing in step S3 in FIG. 5), identify each terminal before assigning a proper address to each.

The exchanges of data result in the proper addresses add1 and add2 being respectively assigned to the terminals 200 and 300 that were both previously assigned the provisional address addx. Before the communication initialization setting procedure starts, the user-dependent information of the terminals 200 and 300 is stored in the central control apparatus 100 and the terminals 200 and 300 respectively store their own unique terminal information. This information is transferred by the data exchanges between the central control apparatus 100 and the terminals 200 and 300, so that the unique terminal information and the user-dependent information of the terminal 200 are shared between the central control apparatus 100 and the terminal 200 using their respective storing units, and the unique terminal information and the user-dependent information of the terminal 300 are shared between the central control apparatus 100 and the terminal 300 using their respective storing units.

As described above, the communication initialization setting procedure does not require the user to perform any operations. The central control apparatus 100 and the terminals share the unique terminal information and the user-dependent information using their respective storing units, so that the amount of data that is transferred thereafter when performing control can be reduced, simplifying the control procedures performed between the control apparatus and the controlled apparatus(es).

The communicative control system of the above embodiment describes the case where the unique terminal information that is stored before the communication initialization setting procedure takes place includes the manufacturer, product number and model number. However, the unique terminal information A may only include one of these three elements, or the communication initialization setting procedure may be performed according to the information shown in Table 2.

As shown in Table 2, this modification has the unique terminal information split into the unique terminal information A, the unique terminal information B, and the unique terminal information C. The unique terminal information A includes an appliance classification. The unique terminal information B includes the manufacturer and product number. The unique terminal information C includes the manufacturing date, the manufacturing location, the manufacturing lot, the functions provided to the terminal, the functions that can be controlled remotely, the power consumption, and the model number. In such a case, the unique terminal information A is stored in the central control apparatus 100 before the communication initialization setting procedure is commenced. The unique terminal information B is transferred together with an address request from the terminal 200 to the central control apparatus 100 during the communication initialization setting procedure. The unique terminal information C is transmitted from the terminal 200 to the central control apparatus 100 after the terminal 200 has been assigned a proper address.

The following describes the processing for having the central control apparatus 100 assign a proper address to the terminal 200 as part of the communication initialization setting procedure of the communicative control system of this modification. This description refers to Table 3 and to FIG. 6. The user-dependent information is stored, managed and communicated in the same way as above, and so will not described further.

As shown in Table 3, the communicative control system of this modification associates in advance (1) the addresses stored in the address storing unit 121 which are to be assigned to appliances with (2) the appliance classifications stored in the unique terminal information storing unit 122. In more detail, before the communication initialization setting procedure (which assigns a proper address to the terminal 200 for use in subsequent communication and transfers the information required for control) is commenced, the central control apparatus 100 has the address 10 assigned to "air conditioner 1" which will be the first air conditioner connected to the system, the address 11 assigned to "air conditioner 2" that will be the second air conditioner, the address 40 assigned to "water heater 1" that will be the first water heater to be connected, etc. In this way, addresses are set in advance.

In the same way as in FIG. 6, the communication initialization setting procedure commences with the terminal 200 first sending an address request together with the unique terminal information A and B. The central control apparatus 100 determines the appliance classification of the terminal 200 that issued the address request from the unique terminal information A that accompanies the address request, finds an address that is associated with this appliance classification, and assigns the address to the terminal 200. When assigning this address, the central control apparatus 100 also transmits the unique terminal information B. The terminal 200 refers to the unique terminal information B received from the central control apparatus 100 and judges whether to accept the transmitted address as the address newly assigned to the terminal 200. By doing so, hen a plurality of terminals are connected to a central control apparatus, each terminal can be prevented from mistakenly accepting an address that has been assigned to a different terminal.

As described above, the communicative control system of this modification uses different information to the communicative control system that is described as the main embodiment, but enables the central control apparatus 100 to assign a proper address for use in subsequent communication to the terminal 200 using information that is stored in advance in the central control apparatus 100 and a provisional address that is temporarily assigned to the terminal 200.

INDUSTRIAL APPLICABILITY

The communicative control system of the present invention can be used as a system for connecting a central control apparatus to domestic appliances like air conditioners and AV equipment to allow such appliances to be controlled.

What is claimed is:

1. A control system including a control apparatus and a plurality of controlled apparatuses that communicate with the control apparatus via a communication network to enable the control apparatus to control the controlled apparatuses, each controlled apparatus including:
      own address storing means for storing, in advance, a provisional address that provisionally identifies the controlled apparatus when communication is commenced; and
      a first storing means for storing, in advance, a set of unique information that is unique to the controlled apparatus and does not depend on whether or not the controlled apparatus is connected to the communication network,
   and the control apparatus including:
      client address storing means for storing proper addresses for identifying controlled apparatuses once communication has begun, each proper address being exclusively assigned to one of the controlled apparatuses connected to the communication network;
      a second storing means for storing, in advance, a set of unique information for each controlled apparatus connected to the communication network, each set of unique information being associated with one of the proper addresses stored by the client address storing means; and
      first control means for performing control that
         (i) specifies, when communication is commenced, a controlled apparatus to which communication is to be performed using the provisional address stored in the own address storing means of the controlled apparatus,
         (ii) compares a set of unique information stored in the first storing means of the controlled apparatus with a set of unique information stored in the second storing means, and
         (iii) stores, based on a comparison result, a proper address stored in the client address storing means in place of the provisional address in the own address storing means of the controlled apparatus.

2. A control system according to claim 1, wherein each set of unique information includes one of:
   (1) data showing the manufacturer of a controlled apparatus;
   (2) data showing the model number of the controlled apparatus;
   (3) data showing the product number of the controlled apparatus; and
   (4) data showing a classification of the controlled apparatus.

3. A control system according to claim 1, further comprising
   a first external management apparatus that manages the sets of unique information of controlled apparatuses and is outside the communication network,
   wherein sets of unique information stored in advance in the second storing means of the control apparatus have been sent to the control apparatus from the first external management apparatus.

4. A control system according to claim 1
wherein each controlled apparatus further includes third storing means for storing, in advance, a set of first data relating to functions of the controlled apparatus, and
the control apparatus further includes:
fourth storing means for storing sets of first data; and
second control means performing control so that the set of first data stored in the third storing means of a controlled apparatus is copied into the fourth storing means after control has been performed by the first control means.

5. A control system according to claim 4, wherein each set of first data includes data showing functions of the controlled apparatus that can be controlled through communication by the control apparatus and data showing power consumption for the functions.

6. A control system according to claim 1
wherein each controlled apparatus further includes:
fifth storing means for storing a set of second data that cannot be determined when the controlled apparatus is manufactured, and
the control apparatus further includes:
sixth storing means for storing, in advance, the set of second data of each control apparatus; and
third control means for performing control to copy a set of second data already stored in the sixth storing means into the fifth storing means after control has been performed by the first control means.

7. A control system according to claim 6, further comprising
a second external management apparatus that manages the sets of second data but is not connected to the communication network,
wherein the sets of second data stored in advance in the sixth storing means of the control apparatus have been sent to the control apparatus from the second external management apparatus.

8. A control system according to claim 7, wherein each set of second data includes data showing a place where the controlled apparatus is installed and data showing a simple name that identifies the controlled apparatus but differs from the model number.

9. A control apparatus included in the control system of claim 1.

10. A controlled apparatus included in the control system of claim 1.

11. A control system including a control apparatus and a controlled apparatus that communicate with the control apparatus via a communication network to enable the control apparatus to control the controlled apparatus,
wherein a set of first data and a set of second data are commonly established in the control apparatus and the controlled apparatus, the set of first data relating to functions of the controlled apparatus and the set of second data not being determined when the controlled apparatus is manufactured.

12. A control system according to claim 11, wherein each set of first data includes data showing functions of the controlled apparatus that can be controlled through communication by the control apparatus and data showing power consumption for the functions.

13. A control system according to claim 11, wherein each set of second data includes data showing a place where the controlled apparatus is installed and data showing a simple name that identifies the controlled apparatus but differs from the model number.

14. The control apparatus included in the control system of claim 11.

15. The controlled apparatus included in the control system of claim 11.

16. A computer-readable recording medium on which a program to be installed into a control apparatus has been recorded, the control apparatus being connected via a communication network to a plurality of controlled apparatuses that the control apparatus controls through communication,
wherein before commencing communication, each controlled apparatus stores:
(i) a provisional address that is set in advance and enables the control apparatus to provisionally identify the controlled apparatus when communication is commenced; and
(ii) unique information that is unique to the controlled apparatus,
wherein before commencing communication, the control apparatus stores:
(a) proper addresses to be assigned exclusively to controlled apparatuses connected to the communication network; and
(b) sets of unique information, each of which is associated with a different proper address,
and wherein when communication commences, the control apparatus operates according to the program:
(1) to specify a controlled apparatus with which the controlled apparatus has not previously communicated using the provisional address stored by the controlled apparatus;
(2) to compare the set of unique information stored by the controlled apparatus with the sets of unique information in the control apparatus; and
(3) to store, depending on a comparison result, a proper address in place of the provisional address in the controlled apparatus.

17. A computer-readable recording medium on which a program to be installed into controlled apparatus is recorded, the controlled apparatus being connected via a communication network to a control apparatus that controls the controlled apparatus through communication,
wherein before commencing communication, the control apparatus stores:
(1) proper addresses to be assigned exclusively to controlled apparatuses connected to the communication network, each proper address being used to identify a controlled apparatus after communication is commenced; and
(2) sets of unique information, each of which is unique to a controlled apparatus and is exclusively associated with one of the proper addresses,
wherein when communication begins, the control apparatus performs control:
(i) to specify a controlled apparatus using a provisional address that is stored in the controlled apparatus in advance;
(ii) to compares the unique information stored in advance in the controlled apparatus with the unique information stored in the control apparatus; and
(iii) to have the controlled apparatus store a proper address in place of the provisional address, depending on a comparison result, and wherein the controlled apparatus operates according to the program and control by the control apparatus to store the proper address in place of the provisional address.

18. A process of installing an appliance that can be remotely controlled by a central control apparatus that can control a plurality of appliances at a location without requiring skilled technical support for installation, the appliance having a pre-assigned address and a set of unique information characteristic of the appliance, comprising the steps of:

connecting the appliance to a communication line with the central control apparatus;

forwarding the pre-assigned address and at least a predetermined portion of the unique information to the central control apparatus;

comparing the portion of the unique information with pre-stored information in the central control apparatus and if a match is found, assigning a new address to the appliance;

transmitting the assigned new address to the appliance;

installing the assigned new address as the only address of the appliance in place of the pre-assigned address;

forwarding the remainder of the unique information from the appliance to the central control apparatus; and transmitting user dependent information from the central control apparatus to the appliance to enable user settings to be applied.

* * * * *